United States Patent [19]

Udagawa

[11] Patent Number: 4,828,275
[45] Date of Patent: May 9, 1989

[54] GASKET WITH ELASTIC SEALING MEMBERS

[75] Inventor: Tsunekazu Udagawa, Ichikawa, Japan

[73] Assignee: Ishikawa Gasket Co., Ltd., Tokyo, Japan

[21] Appl. No.: 204,807

[22] Filed: Jun. 10, 1988

Related U.S. Application Data

[63] Continuation-in-part of Ser. No. 18,235, Feb. 24, 1987, Pat. No. 4,778,189.

[30] Foreign Application Priority Data

Apr. 11, 1986 [JP] Japan .............. 61-054526[U]

[51] Int. Cl.⁴ .............................. F16J 15/10
[52] U.S. Cl. .................... 277/207 R; 277/215; 277/235 B
[58] Field of Search .............. 277/207 R, 211, 213, 277/215, 235 B

[56] References Cited

U.S. PATENT DOCUMENTS

| | | | |
|---|---|---|---|
| 138,633 | 5/1873 | Gifford | 277/207 R |
| 697,546 | 4/1902 | Schier et al. | 277/211 X |
| 1,234,416 | 7/1917 | Sweigard | 277/207 R |
| 1,883,609 | 10/1932 | Dennis | 277/207 R |
| 3,123,367 | 3/1964 | Brummer et al. | 277/207 R |
| 3,151,869 | 10/1964 | Butcher | 277/211 X |
| 3,228,039 | 1/1966 | Freeman | 277/207 R |
| 3,246,920 | 4/1966 | Pall | 277/207 R |
| 3,892,417 | 7/1975 | Clayton | 277/207 R |
| 4,625,979 | 12/1986 | Inciong | 277/235 B |

FOREIGN PATENT DOCUMENTS 13928 of 1905 United Kingdom .............. 277/211

*Primary Examiner*—Robert S. Ward
*Attorney, Agent, or Firm*—Frank J. Jordan; C. Bruce Hamburg; Manabu Kanesaka

[57] ABSTRACT

A gasket comprises a main body having at least one opening and a plurality of elastic members provided on at least one of upper and lower surfaces of the main body. The elastic members project outwardly from the upper or lower surface. The characteristics of at least one of the elastic members are different from those of the others. The elastic members surround the opening so that when the gasket is compressed between two parts, the elastic members deform to thereby securely seal around the opening.

9 Claims, 2 Drawing Sheets

GASKET WITH ELASTIC SEALING MEMBERS

CROSS REFERENCE TO RELATED APPLICATIONS

This is a continuation-in-part application of Ser. No. 018,235 filed on Feb. 24, 1987, and now U.S. Pat. No. 4,778,189.

BACKGROUND OF THE INVENTION AND RELATED ART STATEMENT

The present invention relates to a gasket for sealing between two parts, more particularly a gasket especially designed to seal around a fluid passage.

When two parts having fluid passages therein are connected together, a gasket having an opening corresponding to the fluid passages is disposed between the two parts. Conventionally, the gasket is provided with a body having an opening, and a resilient layer mounted on the body around the opening thereof. When the gasket is positioned between the two parts and is tightened, the resilient layer receives sealing pressure to thereby seal between the two parts.

The conventional gasket is provided with one resilient layer on the body, which is formed on the body for 2-4 mm width and 50-100 micra thickness by a screen printing.

Since the conventional gasket includes only one resilient layer on the body, if the resilient layer receives heavy load, plastic deformation occurs on the resilient layer. If heavy load is applied repeatedly, the resilient layer is finally broken, so that the resilient layer can not provide adequate sealing pressure thereon.

Accordingly, one object of the present invention is to provide a gasket which can seal properly around a fluid passage.

Another object of the invention is to provide a gasket as stated above, which can seal efficiently for a long usage.

A further object of the invention is to provide a gasket as stated above, which can be easily and economically manufactured.

Further objects and advantages of the invention will be apparent from the following description of the invention.

SUMMARY OF THE INVENTION

In accordance with the present invention, a gasket comprises a main body having at least one opening to be sealed therearound, and a plurality of elastic members provided on at least one of upper and lower surfaces of the main body. The elastic members project outwardly from the upper or lower surface. The characteristics of at least one of the elastic members are different from those of the other elastic members. Namely, at least one of the elastic members is made of a material different from the others. The elastic members surround the opening respectively so that when the gasket is compressed for sealing, the elastic members deform to thereby securely seal around the opening.

The elastic members are spaced apart from each other to seal around the opening independently. Leakage of fluid passing through the opening is prevented by the elastic members. Generally, the elastic members may be provided on one side of the main body. However, the elastic members may be formed on two sides of the main body.

The cross sectional dimensions of all the elastic members may be the same. Alternatively, the cross sectional dimensions of one of the elastic members may be larger than those of the other elastic members. Preferably, the elastic member having the large cross sectional dimensions may be made softer than the others.

Preferably, when a water hole is sealed, an inner elastic member is made of a material which is expandable when contacting with water, while an outer elastic member is made of a material strong against or resistant to water. On the other hand, when an oil hole is sealed, an inner elastic member is made of a material which is expandable when contacting with oil, while an outer elastic member is made of a material strong against or resistant to oil.

DETAILED DESCRIPTION OF PREFERRED EMBODIMENTS

Figure 1:
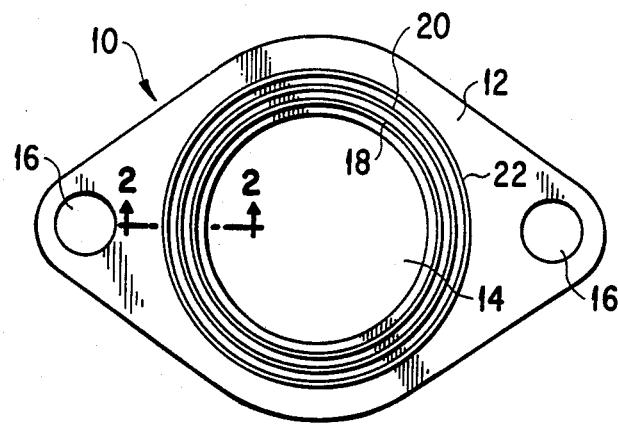
FIG. 1 is a plan view of a first embodiment of a gasket of the invention.
Figure 2:
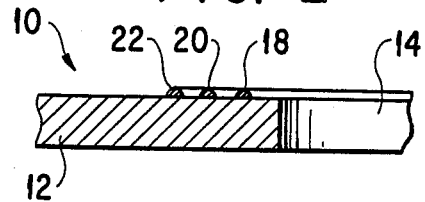
FIG. 2 is an enlarged cross section view taken along lines 2—2 in FIG. 1.

Referring to FIGS. 1 and 2, one embodiment 10 of a gasket of the invention is shown, wherein a technical idea of the invention is applied to a flange gasket.

The gasket 10 comprises a main body 12 having a fluid passage 14 and two bolt holes 16, and three elastic members 18, 20, 22 formed on the main body 12 to surround the passage 14. The three elastic members 18, 20, 22 are arranged close to each other and concentrically relative to the passage 14.

The elastic members 18, 20, 22 are made of silicone rubber. However, the elastic members may be made of silicone resin, epoxy resin or fluorine-contained polymers. The elastic members may be made of any kind of materials if they have elasticity. If the gasket is used for a member where high temperature is applied, such as a head gasket, the elastic member must have an anti-heat property as well.

The elastic members are concentrically arranged on the main body 12, but the elastic members need not be arranged concentrically. Also, three elastic members are formed on the main body 12, but two elastic members may be sufficient. Further, the elastic members need not be the same shape.

In the gasket 10, the main body 12 is composed of a single plate, but the main body may be a steel laminate gasket or an asbestos gasket. Further, the elastic members may be formed on both sides of the main body.

When the gasket 10 is situated between two members and is tightened, the three elastic members receive sealing pressure equally. Therefore, even if high pressure is repeatedly applied thereto, the sealing ability of the elastic members does not change. Further, the three elastic members cooperate together and prevent leakage of the gasket.

Figure 3:
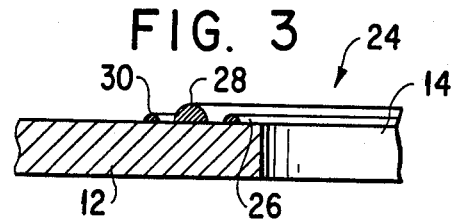
FIG. 3 is a cross section view similar to FIG. 2 for showing a second embodiment of a gasket of the invention.

FIG. 3 shows a second embodiment 24 of a gasket of the invention. The gasket 24 comprises the main body 12 and three elastic members 26, 28, 30. The central elastic member 28 is made larger in cross section and softer than the other elastic members 26, 30.

In use, when the gasket 24 is situated between two members and is tightened, at first the central elastic member 28 deforms. The deformation of the elastic member 28 toward the elastic members 26, 30 is prevented by the respective elastic members 26, 30. Namely, the elastic members 26, 30 operate to support the elastic member 28. As a result, sealing pressure applied to the elastic member 28 can be effectively retained. Since the elastic member 28 is made of a soft material, even if high pressure is repeatedly applied to the gasket, the sealing ability of the elastic member 28 does not change.

Figure 4:
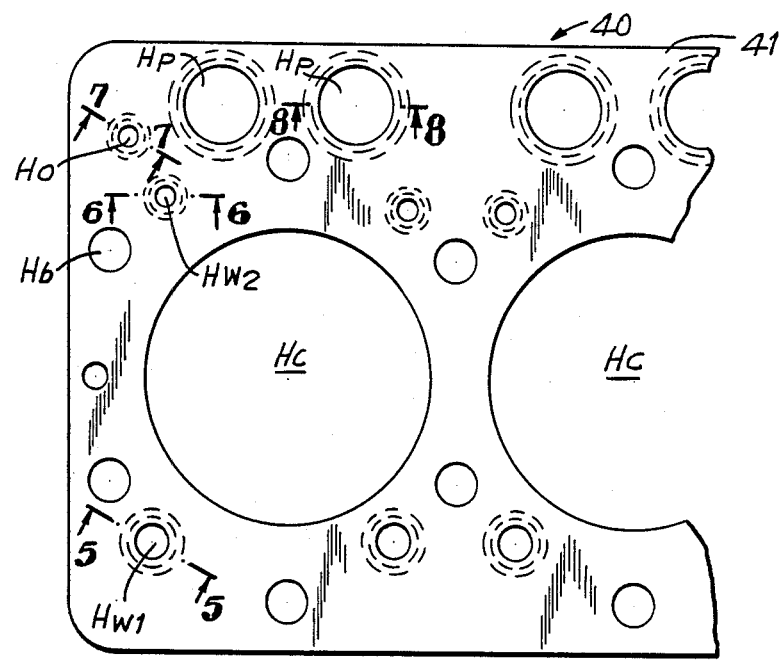
FIG. 4 is a plan view of a part of a cylinder gasket of the invention.

FIG. 4 shows a cylinder gasket 40, on which third to sixth embodiments for sealing around holes are presented. The gasket 40 is formed of a main body 41 including cylinder holes Hc, water holes Hw1, Hw2, oil holes Ho and push rod holes Hp. The sealing mechanisms in accordance with the present invention are formed around the water holes Hw1, Hw2, oil holes Ho and push rod holes Hp. In FIG. 4, elastic members for constituting the sealing mechanisms are shown in chain lines.

Figure 5:
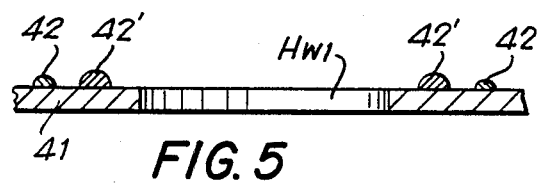
FIG. 5 is an enlarged cross section view taken along lines 5—5 in FIG. 4 for showing a third embodiment of the invention.

In the third embodiment of the invention as shown in FIG. 5, a soft elastic member 42' and a hard elastic member 42 are formed around the water hole Hw1. In the third embodiment, since the cross section of the soft elastic member 42' is made larger than that of the hard elastic member 42, when the gasket is tightened, the soft elastic member 42' deforms more than the hard elastic member 42. Therefore, the soft elastic member 42' seals around the water hole Hw1 tightly, while the hard elastic member 42 protects excessive deformation of the soft elastic memer 42'. This combination properly seals around the water hole Hw1.

Figure 6:
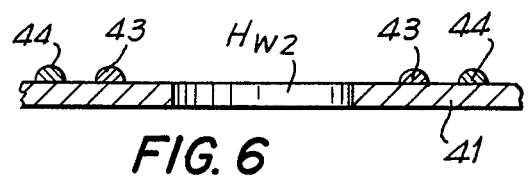
FIG. 6 is an enlarged cross section view taken along lines 6—6 in FIG. 4 for showing a fourth embodiment of the invention.

In the fourth embodiment as shown in FIG. 6, the water hole Hw2 is surrounded by a water expandable elastic member 43 and a water resistant elastic member 44. The water expandable elastic member 43 absorbs water and expands slightly. Examples of the water expandable elastic member 43 are acrylic acid type or methacrylic acid type high molecular materials, which may be used alone or combined with NBR rubber, silicone rubber or silicone resin. On the other hand, examples of the water resistant elastic member 44 are NBR rubber, epoxy resin, silicone resin, silicone rubber, fluorocarbon resin and so on.

Since the water expandable elastic member 43 is located adjacent to the water hole Hw2, an area around the water hole Hw2 is sealed tightly by expansion of the member 43. Further, since the water resistant elastic member 44 is formed outside the water expandable elastic member 43, sealability is assured.

Figure 7:
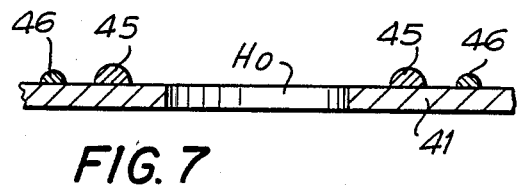
FIG. 7 is an enlarged cross section view taken along lines 7—7 in FIG. 4 for showing a fifth embodiment of the invention.

In the fifth embodiment as shown in FIG. 7, the oil hole Ho is surrounded by an oil expandable elastic member 45 and an oil resistant elastic member 46. The cross section of the oil expandable elastic member 45 is made larger than that of the oil resistant elastic member 46. The oil expandable elastic member 45 absorbs oil and expands slightly. Examples of the oil expandable elastic member 45 are SBR type rubber and natural rubber, while examples of the oil resistant elastic member 46 are NBR type rubber, epoxy resin, silicone resin, silicone rubber, fluorocarbon resin and so on.

Since the oil expandable elastic member 45 is made large and is located adjacent to the oil hole Ho, an area around the oil hole Ho is sealed tightly by expansion of the member 45. Further, since the oil resistant elastic member 46 is placed outside the oil expandable elastic member 45, sealability is assured.

Figure 8:
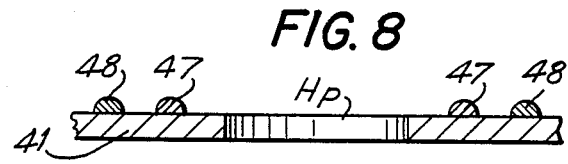
FIG. 8 is an enlarged cross section view taken along lines 8—8 in FIG. 4 for showing a sixth embodiment of the invention.

In the sixth embodiment as shown in FIG. 8, the push rod hole Hp is surrounded by an oil expandable elastic member 47 and an oil resistant elastic member 48. Since oil does not flow through the push rod hole Hp, the cross section of the member 47 is substantially the same as the member 48. The area around the push rod hole Hp can be securely sealed by the members 47, 48.

In the past, the sealing pressure on a gasket is applied to a relatively thick single resilient layer, so that the sealing pressure is concentrated at the resilient layer. Therefore, the resilient layer may be broken by a long usage.

However, in the present invention, a plurality of elastic members are formed on the main body. Although the total sealing dimensions of the elastic members of the invention is substantially the same as those of the resilient layer in the conventional gasket, the sealing pressure is not concentrated in one area and is spread to all the elastic members. Therefore, break of the elastic members is effectively prevented.

Also, the sizes of the elastic members of the present invention may be made different. Further, the characteristics or quality of the elastic members may be made different. As a result, it is possible to seal around the holes in accordance with the characteristics of the fluid passing through the holes.

While the invention has been explained with reference to the specific embodiments of the invention, the explanation is illustrative and the invention is limited only by the appended claims.

What is claimed is:

1. A gasket for sealing between two engine parts, comprising:
   a main body having at least one opening to be sealed therearound, and upper and lower surfaces, and
   a plurality of elastic members provided on at least one of the upper and lower surfaces to project outwardly therefrom, at least one of the elastic members being made of a material different from the others so that characteristics of at least one of the elastic members being different from those of the other elastic members, said elastic members surrounding the opening respectively so that when the gasket is compressed for sealing between the two parts, the elastic members deform to thereby securely seal around the opening, the elastic member situated adjacent to the opening being softer than the elastic member situated away from the opening.

2. A gasket according to claim 1, wherein said elastic members are spaced apart from each other to seal around the opening independently.

3. A gasket according to claim 2, wherein cross sectional dimensions of the respective elastic members taken along the radial direction of the opening are different.

4. A gasket according to claim 3, wherein the elastic member having the large cross sectional dimensions is softer than the others.

5. A gasket for sealing between two engine parts, comprising:
   a main body having at least one opening to be sealed therearound, and upper and lower surfaces, and
   a plurality of elastic members provided on at least one of the upper and lower surfaces to project outwardly therefrom, at least one of the elastic members being made of a meterial different from the others so that characteristics of at least one of the elastic members being different from those of the other elastic members, said elastic members surrounding the opening respectively so that when the gasket is compressed for sealing between the two parts, the elastic members deform to thereby securely seal around the opening, the elastic member situated adjacent to the opening being expandable relative to water and the elastic member remote from the opening having water resistance.

6. A gasket according to claim 5, wherein said elastic members are spaced apart from each other to seal around the opening independently.

7. A gasket for sealing between two engine parts, comprising:
   a main body having at least one opening to be sealed therearound, and upper and lower surfaces, and
   a plurality of elastic members provided on at least one of the upper and lower surfaces to project outwardly therefrom, at least one of the elastic members being made of a material different from the others so that characteristics of a least one of the elastic members being different from those of the other elastic members, said elastic members surrounding the opening respectively so that when the gasket is compressed for sealing between the two parts, the elastic members deform to thereby securely seal around the opening, the elastic member situated adjacent to the opening being expandable relative to oil and the elastic member remote from the opening having oil resistance.

8. A gasket according to claim 7, wherein said elastic members are spaced apart from each other to seal around the opening independently.

9. A gasket according to claim 8, wherein cross sectional dimensions of the respective elastic members taken along the radial direction of the opening are different.

* * * * *